July 1, 1958
J. R. MILES
2,840,940
MECHANICAL READING AND WRITING TABLET
Filed Nov. 5, 1956
2 Sheets-Sheet 1
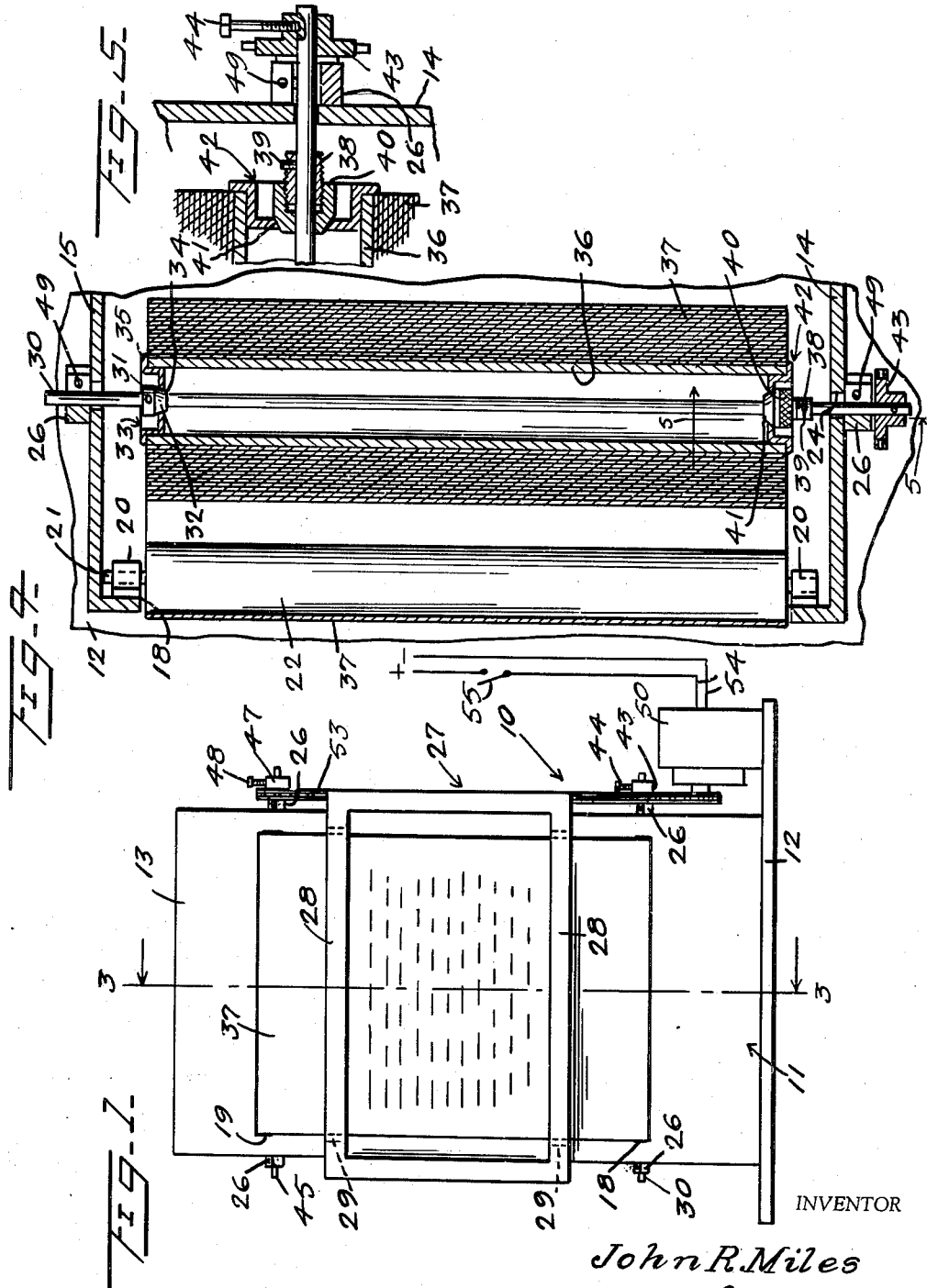
INVENTOR
John R. Miles
BY John N. Randolph
ATTORNEY July 1, 1958 J. R MILES 2,840,940
MECHANICAL READING AND WRITING TABLET
Filed Nov. 5, 1956 2 Sheets-Sheet 2
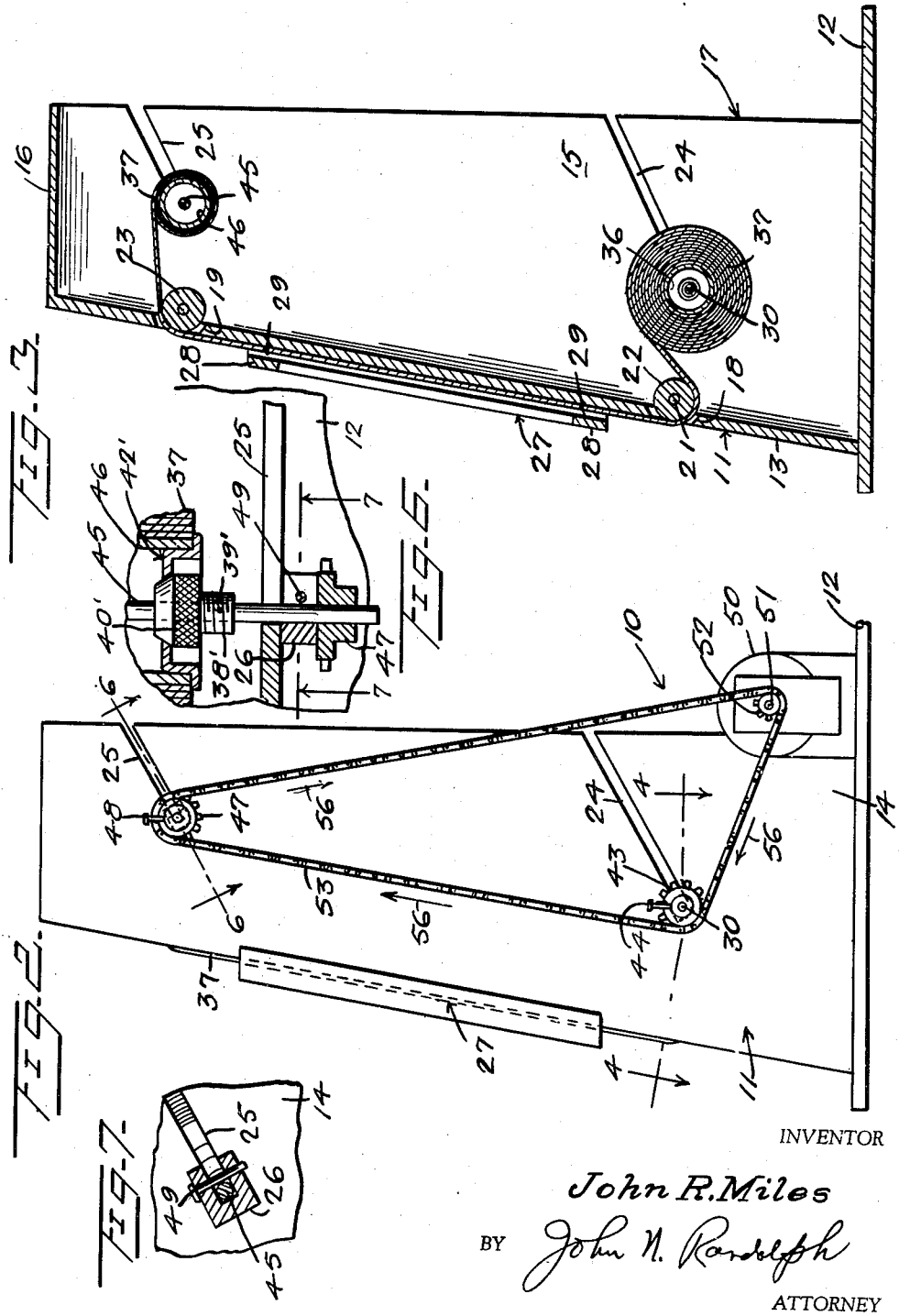
INVENTOR
John R. Miles
BY John N. Randolph
ATTORNEY

United States Patent Office 2,840,940
Patented July 1, 1958

2,840,940

MECHANICAL READING AND WRITING TABLET

John R. Miles, Williamsport, Md.

Application November 5, 1956, Serial No. 620,225

3 Claims. (Cl. 40—31)

This invention relates to an apparatus primarily adapted for use as an educational aid in classrooms, in connection with television educational programs and otherwise where instruction is being given requiring writing or the use of written matter or illustrations.

More particularly, it is a primary object of the present invention to provide a mechanism, constituting a visual aid, providing a surface which can be utilized in lieu of a blackboard for receiving written matter, which written matter after use can be moved from an exposed position and replaced by a clean surface without erasing the previously written material and without the delay incident to such erasing.

Accordingly, it is an object of the present invention to provide an apparatus wherein written matter utilized in connection with education will be retained and may be kept as a record for re-use at a later date, as for example in reviewing subject matter previously taught.

Still a further object of the invention is to provide an apparatus of extremely simple construction having novel means for moving a strip on which subject matter has been or will be written to avoid delay such as occurs in the use of a blackboard, where it is necessary to erase, to make it possible for material, to be used in connection with a period of instruction, to be prepared in advance where desired, and displayed progressively from a position in which it can be most easily seen by all of the pupils.

A further object of the invention is to provide an apparatus having novel means for removing and replacing paper rolls on which the written matter is inscribed and for reversing the direction of movement of the paper where necessary or desirable.

Various other objects and advantages of the invention will hereinafter become more fully apparent from the following description of the drawings, illustrating a presently preferred embodiment thereof, and wherein:

Figure 1 is a front elevational view of the apparatus;

Figure 2 is an enlarged side elevational view thereof, looking from right to left of Figure 1;

Figure 3 is a vertical sectional view of the apparatus, taken substantially along a plane as indicated by the line 3—3 of Figure 1, and on an enlarged scale relative to Figure 1;

Figure 4 is an enlarged horizontal fragmentary sectional view, taken substantially along a plane as indicated by the line 4—4 of Figure 2;

Figure 5 is an enlarged fragmentary vertical sectional view, taken substantially along a plane as indicated by the line 5—5 of Figure 4;

Figure 6 is an enlarged fragmentary sectional view, taken substantially along a plane as indicated by the line 6—6 of Figure 2, and Figure 7 is a fragmentary sectional view, taken substantially along a plane as indicated by the line 7—7 of Figure 6.

Referring more specifically to the drawings, the mechanical reading and writing tablet in its entirety and comprising the invention is designated generally 10 and includes a housing, designated generally 11. The housing 11 includes a substantially flat base 12, a front wall 13, side walls 14 and 15, and a top wall 16. The front wall 13 is disposed at an incline upwardly and rearwardly from adjacent a forward edge of the base 12, as best seen in Figure 3, and combines with said base, the side walls 14 and 15 and the top wall 16 to form the housing 11 which has an open rear side 17. The front wall 13, near its lower end, is provided with an elongated opening 18 which extends transversely thereof, and said front wall 13 is provided with a similar opening 19 near its upper end, and which is disposed substantially parallel to the opening 18. As best seen in Figure 4, pairs of bearings 20 are secured internally of the housing 11, beyond the ends of the openings 18 and 19, for journalling shafts 21 on which are mounted guide rollers 22 and 23. The guide roller 22 is disposed adjacent the opening 18 and the guide roller 23 is located adjacent the opening 19. The side walls 14 and 15 are provided with corresponding lower slots 24 which extend downwardly and inwardly thereof from the open rear side 17 of the housing, and said side walls are provided with corresponding upper slots 25 which likewise extend downwardly and inwardly from said open rear side. Substantially U-shape bearing members 26 are secured to the outer sides of the walls 14 and 15 and are disposed in registration with the lower ends of the slots 24 and 25, as best illustrated in Figures 6 and 7.

A substantially rectangular frame 27 is secured to the outer side of the front wall 13, between the openings 18 and 19. The top and bottom bars 28 of the frame 27 are recessed on their inner sides to combine with portions of the front wall 13 to form slots 29, which are of a length at least equal to the length of the openings 18 and 19.

A lower shaft 30 has portions journalled in the lower ends of the slots 24 and in the bearings 26 which are in registration therewith. As best seen in Figure 4, a collar 31 is fixed to the shaft 30 between the walls 14 and 15 and adjacent one of said walls, and has a tapered inner end 32. A cup shaped member 33 is disposed on the shaft 30 and has a tapered central opening 34 in which the tapered collar end 32 seats and frictionally engages. Said cup shaped member 33 opens toward the adjacent end of the shaft 30 and has a flange 35 surrounding said open end thereof. An end of a substantially rigid tube 36 fits snugly around the cup shaped member 33 and abuts against the flange 35 thereof. The tube 36 constitutes the core of a roll of paper 37.

An externally threaded sleeve 38, as best seen in Figures 5 and 6, is detachably secured by a setscrew 39 to the shaft 30 within the housing 11 and remote from the collar 31. A nut 40 is threaded on the inner end of the sleeve 38 and has a tapered inner end 41 which is similar to the tapered collar end 32 and which engages in the same manner frictionally with the central portion of a second cup shaped member 42. The cup shaped member 42 also opens outwardly or away from the cup shaped member 33 and engages the opposite end of the tube 36, in the same manner that the first mentioned end of the tube is engaged by the member 33. It will also be apparent that the nut 40 can be turned on the threaded sleeve 38 and moved inwardly for causing the two tapered portions 32 and 41 to be brought into tight frictional gripping engagement with the two cup shaped members to cause the core or tube 36 to be tightly gripped between said cup shaped members, so that the core 36 and roll 37 will rotate with the shaft 30. A sprocket wheel 43 is detachably secured by a setscrew 44 to the shaft 30, on the outer side of the wall 14.

An upper shaft 45 extends through the housing 11 and has portions thereof journalled in the lower ends of the slots 25 and in the bearings 26 which register therewith. A rigid tube or core 46 may be supported concentrically around the shaft 45 to rotate therewith by a set of elements corresponding to those previously described for supporting the core 36, certain of which are shown in Figure 6, including a cup shaped member 42', a threaded sleeve 38' a setscrew 39' and a nut 40', corresponding to the cup shaped member 42, sleeve 38, setscrew 39 and nut 40, respectively. A sprocket wheel 47 is fixed to the shaft 45, outwardly with respect to the wall 14, by a setscrew 48. Pins 49 are detachably mounted in and extend across the bearings 26 immediately above the portions of the shafts 30 and 45, which are journalled in said bearings, for retaining the shafts in engagement with the bearings and with the lower ends of the slots 24 and 25, while said pins 49 are in applied positions.

A power source 50, preferably an electric motor, is secured on a portion of the base 12 and has a drive shaft 51 to which is secured a sprocket wheel 52. An endless chain 53 is trained around the sprocket wheels 43, 47 and 52.

The sheet or elongated strip of paper constituting the roll 37, which is disposed around the shaft 30, has its outer end passing off of the upper part of said roll under the guide roller 22 and outwardly through the opening 18. The paper then passes upwardly on the outer side of the front wall 13, passing through the recesses or slots 29, so that a portion of the strip of paper 37 is disposed against the outer side of the front wall 13 and within the frame 27. Above the upper bar 28 of the frame 27, the paper passes into the housing 11 through the upper opening 19 and over the upper guide roller 23 and then passes over and is wound around the upper core 46 which turns with the shaft 45. The end of the paper may be secured in any suitable manner to the core 46, as by an adhesive element, not shown, which will enable the end of the strip 37 to be readily detached from the core 46, when subsequently unwound therefrom. The electric motor 50 is connected by conductor wires 54 to any suitable source of electric current and a normally open switch 55, of any conventional construction, is interposed in the electric circuit formed by the electrical conductors 54 and is adapted to be conveniently positioned to be held in one hand by the instructor who is using the apparatus 10. The switch is adapted to be manually closed for completing the electric circuit so that the motor 50 can be energized to turn the shaft 51 and sprocket wheel 52 in a direction to cause the chain 53 to move clockwise, as seen in Figure 2 and as indicated by the arrows 56. When the strip 37 is to be unwound from the lower core 36 and onto the upper core 46, the setscrew 44 is loosened and the setscrew 48 is tightened so that the shaft 45 and core 46 can turn with the sprocket wheel 47 and the sprocket wheel 43 can turn, as it is driven by the chain 53, on the shaft 30, while said shaft 30 rotates in the opposite direction as the strip 37 is unwound therefrom by the pull exerted thereon from the shaft 45 and core 46. The sprocket wheel 43 rotating in the opposite direction to the shaft 30 will act as a brake to check rotation of the shaft 30 to maintain the strip taut between the shafts 30 and 45. By releasing pressure on the switch 55 the operator or instructor can de-energize the motor 50 and stop movement of the chain 53. The portion of the strip 37 then located within the border 27 can be used as a tablet or writing surface on which problems or other written matter can be inscribed and on which an illustration can be drawn. When the area of the strip 37 has thus been filled with written matter or illustrations and use thereof for instructional purposes has been completed, it is merely necessary for the operator to again manually close the switch 55 so that movement of said strip upwardly or in the same direction as previously described can be resumed. When another unused portion of the strip has assumed a position in the frame 27, the switch can be permitted to resume an open position to interrupt movement of the strip 37 and the operation previously described can be repeated.

After substantially all of the strip 37 has thus been used up and only an end thereof remains secured to the core 36, the setscrew 44 can be tightened and the setscrew 48 can be loosened. By then closing the switch 55, the lower shaft 30 will be driven in a clockwise direction as seen in Figure 3 for rewinding the strip 37 on the core 36 while the shaft 45 and core 46 are turned by the pull exerted on said core by the strip 37 and against the resistance offered by the sprocket wheel 47 which is rotating clockwise, in the opposite direction to the direction of rotation of said shaft 45.

When the strip 37 has been completely rewound on the core 36, the pins 49 engaging the two lower bearings 26 can be removed and the shaft 30 with the roll of paper 37 supported thereby can then be removed from the apparatus 10 by sliding the shaft ends upwardly through the slots 24 and removing the roll 37 from the open rear 17 of the housing. The sprocket wheel 47 is then removed, after which the setscrew 39 is loosened so that the sleeve 38, nut 40 and the member 42 can be removed, after which the roll of paper 37 and core 36 can be removed from the shaft 30 and replaced by another core and roll of paper, which can then be applied to the housing 11, after being secured on the shaft 30. The operation previously described can then be repeated using the strip of the new roll. It will also be apparent that the wound strip after use could, if desired, be removed from the upper shaft 45 in the same manner as previously described. However, the used strip would then have to be rewound back on the lower shaft before it could be re-used. It will also be apparent that the core 46 and the parts supporting said core on the shaft 45 could be omitted and the end of the strip 37 could be secured directly to the shaft 45.

In addition to the apparatus 10 making more quickly available a clean writing surface by making erasing unnecessary, as when using a blackboard, the paper strip 37 utilized with the apparatus 10 provides a record of the instruction or teaching which can be retained for re-use at another time, as for the purpose of reviewing or in teaching the same subject matter to another class. Also, in utilizing the apparatus 10 written matter may be prepared in advance to avoid delay involved during the class period in writing the material on the sheet or strip 37, where this is feasible.

It will thus be apparent that a unique visual aid to education is provided by the apparatus which can be effectively utilized in connection with classroom instruction and various other educational endeavors including televised educational programs.

Various other modifications and changes are contemplated and may be resorted to, without departing from the function or scope of the invention as hereinafter defined by the appended claims.

I claim as my invention:

1. A mechanical reading and writing apparatus comprising a substantially upright housing including a front wall and side walls, said front wall having vertically spaced horizontally elongated openings, a lower shaft extending across said housing and journalled in said side walls, an upper shaft extending across the housing and journalled in the side walls above the lower shaft, a roll of paper mounted on the lower shaft within the housing, means securing the roll of paper to the lower shaft for rotation therewith, an outer end of the strip forming the roll of paper extending from said roll outwardly through a lower one of the front wall openings and back into the housing through an upper one of the front wall openings for positioning a portion of the paper strip in an exposed position against an outer side of the front wall and between said openings, means detachably connecting said end of the paper strip to the upper shaft for movement therewith, a power source fixed to and supported by a part of the housing, and driving means forming a connection between said power source and the upper shaft and the lower shaft, said driving means including parts disengagedly secured to said shafts whereby either of the shafts may be driven from the power source while the other shaft is disengaged therefrom for winding the paper strip onto the selectively driven shaft and for unwinding it from the other shaft, said strip of paper which is attached to both of said shafts being windable in the same direction whereby movement of said drive means in a single direction will cause the shaft selectively driven by the drive means to wind the paper strip thereon.

2. A mechanical reading and writing apparatus as in claim 1, said drive means comprising an endless chain, sprocket wheels mounted on said shafts for rotation therewith or relative thereto and around which the endless chain is trained, said sprocket wheels constituting said parts of the drive means disengagedly connected to the shafts, and a sprocket wheel driven by the power source and engaging and driving said endless chain.

3. A mechanical display apparatus comprising a substantially upright housing including a front wall and side walls, said front wall having vertically spaced horizontally elongated openings, a lower shaft extending across said housing and journalled in said side walls, an upper shaft extending across the housing and journalled in the side walls above the lower shaft, a roll of paper having a portion mounted on the lower shaft within the housing, said roll including an end secured to said lower shaft for rotation therewith, means securing the opposite end of the roll of paper to the upper shaft, portions of said paper extending through said openings and another portion thereof being slidably disposed on the outer side of said front wall between the openings, a power source fixed to and supported by a part of the housing and including a driving sprocket wheel, sprocket wheels disengagedly secured to corresponding ends of said shafts and disposed in the same vertical plane as said drive sprocket wheel, an endless chain trained around the three sprocket wheels and driven by the drive sprocket wheel to drive the other two sprocket wheels and either of the upper or lower shafts which is fixed to the sprocket wheel thereof, said housing having an open rear side, and said side walls having complementary slots extending downwardly and inwardly from the open rear side of the housing and in which portions of the shafts are removably mounted, one of the slots engaged by said lower shaft being disposed between flights of the endless chain whereby movement of the lower shaft in the slots thereof toward the open ends of said slots will move the sprocket wheel of the lower shaft away from the chain flight engaged thereby toward the other chain flight to provide slack in the chain to facilitate removal and replacement of the upper and lower shafts, said lower shaft being positionable in the slots to properly tension the chain and being disposed out of alignment with the drive sprocket wheel and upper shaft.

References Cited in the file of this patent

UNITED STATES PATENTS

| | | |
|---|---|---|
| 961,062 | Adrian | June 7, 1910 |
| 1,326,396 | Edwards | Dec. 30, 1919 |
| 1,471,286 | Sharpe | Oct. 16, 1923 |
| 1,585,342 | Gilbert et al. | May 18, 1926 |
| 1,963,120 | Duncan et al. | June 19, 1934 |

FOREIGN PATENTS

| | | |
|---|---|---|
| 182,269 | Germany | Jan. 3, 1906 |
| 197,818 | Germany | Feb. 5, 1907 |